US012342814B2

(12) United States Patent
Lorentz et al.

(10) Patent No.: US 12,342,814 B2
(45) Date of Patent: *Jul. 1, 2025

(54) HERBICIDE COMPOSITIONS WITH IMPROVED PROPERTIES

(71) Applicant: BAYER AKTIENGESELLSCHAFT, Leverkusen (DE)

(72) Inventors: Lothar Lorentz, Waldbröl (DE); Roland Deckwer, Düsseldorf (DE); Stefan Sachau, Cologne (DE); Udo Bickers, Cologne (DE); Markus Telscher, Monheim (DE); Angela Kazmierczak, Horace, ND (US)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 685 days.

This patent is subject to a terminal disclaimer.

(21) Appl. No.: 17/264,205

(22) PCT Filed: Jul. 23, 2019

(86) PCT No.: PCT/EP2019/069797
§ 371 (c)(1),
(2) Date: Jan. 28, 2021

(87) PCT Pub. No.: WO2020/025394
PCT Pub. Date: Feb. 6, 2020

(65) Prior Publication Data
US 2021/0307319 A1 Oct. 7, 2021

Related U.S. Application Data

(60) Provisional application No. 62/811,772, filed on Feb. 28, 2019.

(30) Foreign Application Priority Data

Jul. 30, 2018 (EP) ..................... 18186330

(51) Int. Cl.
*A01N 25/30* (2006.01)
*A01N 25/00* (2006.01)
*A01N 25/22* (2006.01)
*A01N 25/24* (2006.01)
*A01N 25/32* (2006.01)
*A01N 31/02* (2006.01)
*A01N 33/08* (2006.01)
*A01N 57/20* (2006.01)
*A01P 13/00* (2006.01)

(52) U.S. Cl.
CPC .............. *A01N 25/24* (2013.01); *A01N 25/30* (2013.01); *A01N 25/32* (2013.01); *A01N 31/02* (2013.01); *A01N 33/08* (2013.01); *A01N 57/20* (2013.01)

(58) Field of Classification Search
CPC ........ A01N 25/30; A01N 25/24; A01N 25/32; A01N 25/00; A01N 57/20; A01N 25/22; A01P 13/00
See application file for complete search history.

(56) References Cited

U.S. PATENT DOCUMENTS

| | | | |
|---|---|---|---|
| 2,510,839 A | 6/1950 | Scmidl | |
| 4,400,196 A | 8/1983 | Albrecht et al. | |
| 4,954,497 A | 9/1990 | Kamikado et al. | |
| 5,152,823 A | 10/1992 | Albrecht et al. | |
| 5,258,358 A | 11/1993 | Kocur et al. | |
| 5,332,714 A | 7/1994 | Albrecht et al. | |
| 5,491,125 A | 2/1996 | Albrecht et al. | |
| 6,087,305 A * | 7/2000 | Kober | A01N 37/04 504/362 |
| 6,713,433 B2 | 3/2004 | Jimoh | |
| 8,110,529 B2 | 2/2012 | Frisch et al. | |
| 8,901,041 B2 | 12/2014 | Frisch et al. | |
| 9,374,996 B2 | 6/2016 | Mertoglu et al. | |
| 2002/0091066 A1 | 7/2002 | Wurtz et al. | |
| 2005/0054532 A1 | 3/2005 | Kocur et al. | |
| 2005/0266999 A1* | 12/2005 | Frisch | A01N 57/20 504/365 |
| 2010/0144725 A1* | 6/2010 | Brandl | A01N 43/653 514/269 |
| 2017/0035046 A1 | 2/2017 | Goyal et al. | |
| 2021/0400955 A1* | 12/2021 | Lorentz | A01N 57/20 |

FOREIGN PATENT DOCUMENTS

| | | | |
|---|---|---|---|
| CH | 692173 | * | 3/2002 |
| CH | 692173 A5 | * | 3/2002 |
| CN | 102651971 A | | 8/2012 |
| EP | 0 476 555 A2 | | 3/1992 |
| JP | 2002-293702 | | 10/2002 |
| WO | WO-92/12637 A1 | | 8/1992 |
| WO | WO-95/16351 A1 | | 6/1995 |
| WO | WO-96/00010 A1 | | 1/1996 |
| WO | WO-96/20593 A1 | | 7/1996 |
| WO | WO-96/22692 A1 | | 8/1996 |
| WO | WO 1996022692 | * | 8/1996 |

(Continued)

OTHER PUBLICATIONS

Tyagi, Sulfosuccinates as mild surfactants, Journal of Oleo Science, vol. 55, No. 9, 429-439. (Year: 2006).*

(Continued)

*Primary Examiner* — Mina Haghighatian
(74) *Attorney, Agent, or Firm* — Harness, Dickey & Pierce, P.L.C.

(57) ABSTRACT

The present invention relates to the technical field of crop protection compositions (formulations) comprising water soluble herbicidal active ingredients and certain further constituents having improved properties, in particular regarding rainfastness and/or herbicidal efficacy. The invention also relates to methods of manufacturing such compositions and the use of such compositions.

20 Claims, No Drawings

(56) References Cited

FOREIGN PATENT DOCUMENTS

| WO | WO-97/00010 A1 | 1/1997 |
| WO | WO-02/26036 A1 | 4/2002 |
| WO | WO-2004/105916 A1 | 12/2004 |
| WO | WO-2007/092351 A2 | 8/2007 |
| WO | WO2011/070054 A1 | 6/2011 |
| WO | WO-2011/086115 A2 | 7/2011 |
| WO | WO 2013043678 * | 3/2013 |

OTHER PUBLICATIONS

Symonds et al., Rainfastness of Poly(vinyl alcohol) Deposits on *Vicia faba* Leaf Surfaces: From Laboratory-Scale Washing to Simulated Rain, ACS Appl. Mater. Interfaces (2016),8, 14220-14230.
U.S. Appl. No. 17/264,218, filed Jan. 28, 2021, Lorentz et al.

* cited by examiner

HERBICIDE COMPOSITIONS WITH IMPROVED PROPERTIES

CROSS-REFERENCE TO RELATED APPLICATIONS

This application is a U.S. national stage filing under 35 U.S.C. § 371 of International Application No. PCT/EP2019/069797, filed on Jul. 23, 2019, which claims the benefit of and priority to European Application No. 18186330.9, filed on Jul. 30, 2018, and U.S. Application No. 62/811,772, filed on Feb. 28, 2019. The entire disclosure of each of the above applications is incorporated herein by reference.

The present invention relates to the technical field of crop protection compositions (formulations) comprising water soluble herbicidal active ingredients and certain further constituents having improved properties, in particular regarding rainfastness and/or herbicidal efficacy. The invention also relates to methods of manufacturing such compositions and the use of such compositions.

Crop protectant compositions can be formulated in many different ways, with the possibility of the characteristics of the active ingredients and the nature of the formulation giving rise to problems in terms of stability, efficacy, and applicability of the formulations. Moreover, certain formulations are more advantageous on economic and environmental grounds than others.

Water-based formulations generally have the advantage that they require a low fraction of organic solvents, or none at all. On the other hand, the distribution of the constituents in such formulations is often inadequate unless appropriate combinations of auxiliaries are used. The performance properties of such formulations frequently depend on a large number of variable parameters, making it impossible simply to select components of known systems and to combine them with the active ingredients intended for new formulation, if the resultant formulation is to be biologically active, stable on storage, and ideal from the applications standpoint.

Rainfastness is the ability of a pesticide (pesticide formulation) to withstand rainfall and retain biological efficacy to a higher degree. For most pesticides, rain immediately after an application will remove most of the pesticide residues from the leave surface. A product remaining to a higher portion on the leave surfaces after a rain event allows for more of the pesticide to penetrate into the leave and providing weed control activity.

A pesticide is considered "rainfast" after application if it has adequately dried, physically retained on the leave surface or has been absorbed by plant tissues so that it remains effective after rainfall or irrigation.

The degree of rainfastness depends on many factors. The most important is the rain. All pesticide products need a certain amount of drying time between application and rainfall.

Some pesticide products are designed with adjuvants, materials added to the formulation to increase the effectiveness. Some adjuvants improve rainfastness by enhancing the capacity of the active ingredient to penetrate into the leave or to bind to the plant/leave surface and are still sufficient selective in herbicide tolerant crops.

Post-emergent herbicides are applied on weeds that have already emerged, one example is glyphosate. Traditional formulations of glyphosate required a dry period of 6 to 12 hours after application. Rain or irrigation within that period would reduce effectiveness and require a second application.

Standard formulations, therefore, are rarely suitable for meeting particular requirements, and it is necessary involve a great deal of experimental work to develop an appropriate formulation. Many herbicidal formulations containing water-soluble active crop protectant ingredients have been described.

Examples of herbicidal formulations comprising glufosinate and certain surfactants are known from U.S. Pat. No. 4,400,196.

U.S. Pat. No. 5,152,823 discloses aqueous pesticidal agents based on active substance-containing dispersions in combination with water-soluble active substances and contain alkyl ether sulfates combined with ethoxylated fatty alcohols and sulfosuccinic monoesters as surfactants.

U.S. Pat. No. 5,258,358 mentions liquid herbicidal compositions comprising glufosinate-ammonium and an alkyl polyglycoside, optionally in combination with certain other surfactants.

U.S. Pat. No. 5,332,714 relates to low-foam concentrated liquid aqueous preparations of plant protecting agents which contain sulfato- or sulfonato-containing surfactants as wetting agents and certain other surfactants as defoamers.

WO 92/12637 discloses improved dry and water soluble glyphosate formulations.

U.S. Pat. No. 6,713,433 teaches liquid concentrate herbicidal emulsion compositions comprising a water-soluble herbicide, an oil-soluble herbicide, a stabilizing amount of water-soluble chlorides, and one or more surfactants.

US 2005/0266999 and U.S. Pat. No. 8,110,529 relate to concentrated aqueous preparations for crop protection comprising certain types of surfactants and ammonium salts or aluminum silicates.

WO 2007/092351 discloses stable, concentrated compositions comprising a water-soluble herbicidal ingredient, an alkyl ether sulfate, an organic solvent and an alkyl polyglucoside.

U.S. Pat. No. 8,901,041 discloses low-foam aqueous formulations for crop protection containing anionic surfactants and specific silicone-based defoamers.

WO 2004/105916 relates to aqueous concentrate composition comprising an agrochemical, one or more foam-inducing surfactants and an antifoam agent wherein the antifoam agent is incorporated into the composition as a solution in an organic solvent.

ACS Appl. Mater. Interfaces 2016, 8, 14220-14230 investigated the rainfastness of poly(vinyl alcohol) deposits on *Vicia faba* leaf surfaces.

U.S. Pat. No. 2,510,839 discloses improved compositions comprising 2,4-D, petroleum oils with a specific viscosity and different sulfonates.

U.S. Pat. No. 4,954,497 relates to certain acrylic acid morpholides showing excellent fungicidal effects even after the rainfall after spraying, superior to those of known compounds.

WO 95/16351 and WO 97/00010 relate to surfactants providing enhanced efficacy and/or rainfastness to pesticide formulations.

U.S. Pat. No. 9,374,996 provides a pesticide composition comprising a copolymer of acrylic acid, poly(alkylene glycol) (meth)acrylate, and alkyl (meth)acrylate with high rainfastness and/or retention of the pesticide.

U.S. Pat. No. 5,491,125 teaches liquid herbicidal compositions comprising glufosinate in combination with certain types of surfactants and a low content of organic solvents which possess improved herbicidal activities, high low-temperature stability and rain resistance.

In view of these known formulations, the object of the present invention was to provide compositions containing one or more water-soluble active herbicidal ingredients having improved properties, in particular improved rainfastness and/or herbicidal properties.

It was found that compositions of water-soluble active herbicidal ingredients in combination with certain surfactants and certain esters have such improved properties, in particular improved rainfastness and/or herbicidal properties.

The invention therefore primarily relates (preferably liquid) crop protectant compositions comprising or consisting of (a) one or more water-soluble herbicidal active crop protectant ingredients (type (a) active ingredients), (b) one or more $C_6$-$C_{16}$ fatty alcohol polyethylene glycol ether sulfates and/or $C_6$-$C_{16}$ alkylpolyglycosides and/or $C_{10}$-$C_{18}$ fatty alkyl amine ethoxylates, (c) one or more esters selected from the group consisting of (c1) to (c3):

(c1) $R^1COOR^2$, wherein $R^1$ denotes a $C_5$-$C_{13}$ alkyl group and $R^2$ denotes a $C_6$-$C_{14}$ alkyl group, wherein the total number of carbon atoms in $R^1$ and $R^2$ taken together is an integer in the range of from 14 to 22, (c2) $R^3OOC$—$(CH_2)x$-$COOR^4$, wherein $R^3$ and $R^4$, independent of each other, denote a $C_4$-$C_{12}$ alkyl group, and x is an integer in the range of from 1 to 6, (c3) $(R^5O)_3P=O$, wherein $R^5$, independent of each other, denote a $C_4$-$C_{16}$ alkyl group, wherein the total number of carbon atoms in the three $R^5$ taken together is an integer in the range of from 18 to 42, and optionally one or more further constituents selected from the group consisting of constituents (d) to (h):

(d) organic solvents (different from constituent (c)), (e) water, (f) other surfactants (i.e. different from constituent (b)), (g) other formulation adjuvants (i.e. different from constituents (b) to (f)), (h) one or more other herbicidal active crop protectant ingredients (i.e. different from constituent (a)) and/or herbicide safeners, wherein the total amount of constituent (a) to the total amount of constituent (c) is in the range of from 125:1 to 1:1, preferably in the range of from 100:1 to 3:2.

In accordance with the invention the compositions containing one or more water-soluble active herbicidal ingredients (constituent (a)) exhibit improved properties, in particular improved rainfastness and/or herbicidal properties, due to the combination of constituents (b) and (c) as defined in the context of the present invention.

Generally and preferably, the compositions according to the present invention are liquid at 25° C. and 1013 mbar.

Preferably, a composition according to the present invention comprises or consists of constituent (a) in a total amount 5% to 70% by weight,
constituent (b) in a total amount 5% to 60% by weight,
constituent (c) in a total amount 0.5% to 12% by weight,
and optionally one or more further constituents selected from the group consisting of constituents (d) to (h)
constituent (d) in a total amount 0% to 15% by weight,
constituent (e) in a total amount 0.1% to 60% by weight,
constituent (f) in a total amount 0.1% to 30% by weight,
constituent (g) in a total amount 0.1% to 20% by weight,
constituent (h) in a total amount 0.1% to 20% by weight,
in each case based on the total weight of the composition.

Preferably, a composition according to the present invention comprises or consists of constituent (a) in a total amount 10% to 60% by weight,
constituent (b) in a total amount 5% to 50% by weight,
constituent (c) in a total amount 1% to 10% by weight,
constituent (e) in a total amount 20% to 60% by weight,
and optionally one or more further constituents selected from the group consisting of constituents (d), (f), (g) and (h)
constituent (d) in a total amount 0% to 15% by weight,
constituent (f) in a total amount 0.1% to 20% by weight,
constituent (g) in a total amount 0.1% to 12% by weight,
constituent (h) in a total amount 0.1% to 12% by weight,
in each case based on the total weight of the composition.

The water-soluble herbicidal active crop protectant ingredients of constituent (a) and the other herbicidal active crop protectant ingredients and herbicide safeners of the optional constituent (h) of the compositions according to the present inventions and the common names used herein are commonly known; see, for example, "The Pesticide Manual" 16th Edition, British Crop Protection Council 2012; these include the known stereoisomers (in particular racemic and enantiomeric pure isomers) and derivatives such as salts or esters, and particularly the commercially customary forms.

In the context of the present invention water-soluble herbicidal active crop protectant ingredients (type (a) active ingredients) have a water solubility at 20° C. and 1013 mbar (typically at a pH in the range of 4-7, depending on the form) of at least 5 g/l or higher, preferably of at least 10 g/l or higher, more preferably of at least 20 g/l or higher.

To allow a high concentration of one or more water-soluble herbicidal active crop protectant ingredients (type (a) active ingredients) in the compositions according to the present invention, the type (a) active ingredients are preferably used in form of their salts since these generally speaking show higher water solubility.

The compositions according to the present invention preferably comprise as constituent (a) one or more water-soluble active crop protectant ingredients selected from the group consisting of glufosinate [2-amino-4-[hydroxy (methyl)phosphinoyl]butanoic acid] and salts thereof, glyphosate [N-(phosphonomethyl)glycine] and salts thereof, MCPA [(4-chloro-2-methylphenoxy)acetic acid] and salts thereof, dicamba [3,6-dichloro-2-methoxybenzoic acid] and salts thereof, 2,4-D [2,4-dichlorophenoxy)acetic acid] and salts thereof and dichlorprop [2-(2,4-dichlorophenoxy)propanoic acid] and the salts thereof.

The compositions according to the present invention preferably comprise as constituent (a) one or more water-soluble active crop protectant ingredients selected from the group consisting of glufosinate-ammonium, glufosinate-sodium, L-glufosinate-ammonium, L-glufosinate-sodium, glyphosate-diammonium, glyphosate-dimethylammonium, glyphosate-isopropylammonium, glyphosate-monoammonium, glyphosate-potassium, glyphosate-dipotassium, glyphosate-sesquisodium (N-(phosphonomethyl)glycine sodium salt (2:3)), glyphosate-trimesium, MCPA-dimethylammonium, MCPA-diolamine, MCPA-olamine, MCPA-potassium, MCPA-sodium, MCPA-trolamine, dicamba-biproamine, dicamba-diglycolamine, dicamba-dimethylammonium, dicamba-diolamine, dicamba-isopropylammonium, dicamba-olamine, dicamba-potassium, dicamba-sodium, dicamba-trolamine, dicamba-choline, dicamba-BAPMA (N,N-bis-(3-aminopropyl)methylamine salt), 2,4-D-ammonium, 2,4-D-choline, 2,4-D-BAPMA (N,N-bis-(3-aminopropyl)methylamine salt), 2,4-D-diethylammonium, 2,4-D-dimethylammonium, 2,4-D-diolamine, 2,4-D-dodecylammonium, 2,4-D-heptylammonium, 2,4-D-isopropylammonium, 2,4-D-lithium, 2,4-D-potassium, 2,4-D-sodium, 2,4-D-tetradecylammonium, 2,4-D-triethylammonium, 2,4-D-tris(2-hydroxypropyl)ammonium, 2,4-D-trolamine, dichlorprop-dimethylammonium, dichlorprop-ethylammonium, dichlorprop-potassium, and dichlorprop-sodium.

Particularly preferably, constituent (a) of compositions according to the present invention comprises or consists of glufosinate-ammonium, glufosinate-sodium, L-glufosinate-ammonium, L-glufosinate-sodium, glyphosate-potassium, glyphosate-ammonium, glyphosate-dimethylammonium, glyphosate-isopropylammonium, glyphosate-trimesium (sulfosate), dicamba-diglycolamine, dicamba-BAPMA, and 2,4-D-choline.

Constituent (b) of the compositions according to the present invention is a group of surfactants known from the prior art to allow good stability and/or activity of compositions comprising water-soluble herbicidal active crop protectant ingredients (type (a) active ingredients).

The $C_6$-$C_{16}$ fatty alcohol polyethylene glycol ether sulfates of constituent (b) of the present invention preferably correspond to the formula $CH_3(CH_2)_m(OCH_2CH_2)_nOSO_3M$, wherein M is a cation, m denotes an integer of from 4 to 15 and n is 2, 3, 4 or 5.

Preferably, M is selected from $Na^+$, $K^+$ or $NH_4^+$, m denotes an integer of from 6 to 15 and n is 2, 3, 4 or 5.

More preferably, M is selected from $Na^+$, $K^+$ or $NH_4^+$, m denotes an integer of from 9 to 15 and n is 2, 3, 4 or 5.

More preferred fatty alcohol polyethylene glycol ether sulfates as constituent (b) are $C_{10}$-$C_{16}$ fatty alcohol diethylene glycol ether sulfates (i.e. n is 2).

The $C_6$-$C_{16}$ alkylpolyglycosides of constituent (b) of the present invention preferably are $C_6$-$C_{16}$ alkylpolyglucosides, more preferably $C_8$-$C_{12}$ alkylpolyglucosides.

$C_6$-$C_{16}$ Alkylpolyglycosides, in particular $C_6$-$C_{16}$ alkylpolyglucosides, suitable as constituent (b) are known in the art and commercially available, e.g. alkylpolysaccharides and mixtures thereof such as those, for example, from the ®Atplus series (Croda) with or without addition of inorganic salts such as ammonium sulfate, alkylpolyglycosides in the form of the Agnique PG® grades from BASF, an example being ®Agnique PG 8107 (fatty alcohol $C_8$-$C_{10}$ glucosides), ®Agnique PG 9116 (fatty alcohol $C_9$-$C_{11}$ glucosides), alkylpolyglycoside/alkylpolysaccharide mixtures based on $C_8$-$C_{10}$ fatty alcohol such as ®Glucopon 225 DK and ®Glucopon 215 CSUP (BASF).

The $C_{10}$-$C_{18}$ fatty alkyl amine ethoxylates of constituent (b) of the present invention preferably correspond to the formula $H(OCH_2CH_2)_pN(R^6)(CH_2CH_2O)_qH$, wherein $R^6$ denotes a $C_{10}$-$C_{18}$ alkyl group, p denotes an integer of from 1 to 10 and q denotes an integer of from 1 to 10.

Preferably, $R^6$ denotes a $C_{12}$-$C_{18}$ alkyl group, p denotes an integer of from 1 to 8 and q denotes an integer of from 1 to 8.

More preferably, $R^6$ denotes a $C_{12}$-$C_{16}$ alkyl group, p denotes an integer of from 1 to 6 and q denotes an integer of from 1 to 6.

More preferably, constituent (b) of the compositions according to the present invention comprises or consists of one or more $C_{10}$-$C_{16}$ fatty alcohol diethylene glycol ether sulfate salts and/or $C_8$-$C_{12}$ alkylpolyglucosides with a degree of polymerization of less than 5, and/or $C_{12}$-$C_{16}$ alkyl amine ethoxylates with 2 to 10 ethylene oxide (EO) units.

Particularly preferably, constituent (b) of the compositions according to the present invention comprises or consists of one or more $C_{12}$-$C_{14}$ fatty alcohol diethylene glycol ether sulfate sodium-, potassium-, ammonium-salts (preferably sodium salts) and/or $C_8$-$C_{10}$ alkylpolyglucosides with a degree of polymerization of less than 2, and/or $C_{12}$-$C_{14}$ alkyl amine ethoxylates with 4 to 8 ethylene oxide (EO) units [preferably 3-isotridecyloxypropanamine, ethoxylated (CAS number 68478-96-6; systematic name: Poly(oxy-1,2-ethanediyl),.alpha.,.alpha.'-[[[3-(tridecyloxy)propyl]imino]di-2,1-ethanediyl]bis[.omega.-hydroxy-, branched)].

In a composition according to the present invention wherein glufosinate-ammonium is (part of) constituent (a), the preferred constituent (b) comprises or consists of one or more $C_{10}$-$C_{16}$ fatty alcohol diethylene glycol ether sulfate salts and/or $C_8$-$C_{12}$ alkylpolyglucosides as defined above, preferably as defined as one of the preferred or more preferred embodiments.

In a composition according to the present invention wherein one of the above-mentioned glyphosate-salts is (part of) constituent (a), the preferred constituent (b) comprises or consists of one $C_8$-$C_{12}$ alkylpolyglucosides and/or $C_{12}$-$C_{16}$ alkyl amine ethoxylates with 2 to 10 ethylene oxide (EO) units as defined above, preferably as defined as one of the preferred or more preferred embodiments.

The advantage of the $C_6$-$C_{16}$ fatty alcohol polyethylene glycol ether sulfates as (part of) constituent (b) of the present invention is that the amount of constituent (c) that is achievable to be incorporated into a composition according to the present invention is higher, thus allowing further improved rainfastness and/or herbicidal activity of said composition.

Constituent (c) of the compositions according to the present invention is a group of esters defined by constituents (c1), (c2) and (c3) having the following structures.

Constituent (c1) of the compositions according to the present invention has the following structure:

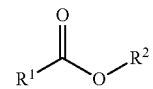

wherein $R^1$ and $R^2$ each denote the respective group defined herein.

Constituent (c2) of the compositions according to the present invention has the following structure:

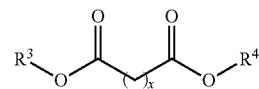

wherein $R^3$, $R^4$ and x each have the respective meaning defined herein.

Constituent (c3) of the compositions according to the present invention has the following structure:

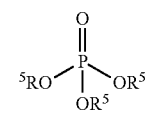

wherein each $R^5$ denotes the respective group defined herein.

The esters used as constituent (c) of the compositions according to the present invention can be produced by any method known in the art, for example esterification of the respective acid or acid halide moiety and the respective alcohol $R^2OH$, $R^3OH$, $R^4OH$, or $R^5OH$. Many esters of constituent (c) of the compositions according to the present are commercially available.

Preferred alkyl groups in the context of the constituents (c1), (c2) and (c3) of constituent (c) according to the present invention, i.e. $R^1$, $R^2$, $R^3$, $R^4$, and $R^5$ respectively, are linear and branched alkyl groups, and preferably are selected from the group consisting of 1-butyl, 2-butyl, isobutyl, tert-butyl, 1-pentyl, 2-pentyl, isopentyl, 1-hexyl, 2-hexyl, isohexyl, 1-heptyl, 2-heptyl, isoheptyl, 1-octyl, 2-octyl, isooctyl, 2-ethylhexyl, 3,5,5-trimethylhexyl, 3,4,4-trimethylpentyl, 1-nonyl, 2-nonyl, isononyl, 1-decyl, 2-decyl, isodecyl, 2-propylheptyl, 1-dodecyl, 2-dodecyl, and isododecyl. More preferred alkyl groups $R^1$, $R^2$, $R^3$, $R^4$, and $R^5$ in the context of the constituents (c1), (c2) and (c3) according to the present invention are branched alkyl groups, each preferably selected from the group consisting of 2-hexyl, isohexyl, 2-heptyl, isoheptyl, 2-octyl, isooctyl, 2-ethylhexyl, 3,5,5-trimethylhexyl, 3,4,4-trimethylpentyl, 2-nonyl, isononyl, 2-decyl, isodecyl, 2-dodecyl, and isododecyl.

Preferably, constituent (c) of the compositions according to the present invention comprises or consists of one or more esters selected from the group consisting of (c1) to (c3):
  (c1) $R^1COOR^2$, wherein $R^1$ denotes a $C_7$-$C_9$ alkyl group and $R^2$ denotes a $C_8$-$C_{10}$ alkyl group, wherein the total number of carbon atoms in $R^1$ and $R^2$ taken together is an integer in the range of from 16 to 20,
  (c2) $R^3OOC$—$(CH_2)x$-$COOR^4$, wherein $R^3$ and $R^4$, independent of each other, denote a $C_6$-$C_{10}$ alkyl group, and x is an integer in the range of from 2 to 5,
  (c3) $(R^5O)_3P$=O, wherein $R^5$, independent of each other, denote a $C_6$-$C_{12}$ alkyl group.

More preferably, constituent (c) of the compositions according to the present invention comprises or consists of one or more esters selected from the group consisting of (c1) to (c3):
  (c1) $R^1COOR^2$, wherein $R^1$ denotes a branched $C_7$-$C_9$ alkyl group and $R^2$ denotes a branched $C_8$-$C_{10}$ alkyl group, wherein the total number of carbon atoms in $R^1$ and $R^2$ taken together is an integer in the range of from 16 to 20,
  (c2) $R^3OOC$—$(CH_2)x$-$COOR^4$, wherein $R^3$ and $R^4$, independent of each other, denote a branched $C_6$-$C_{10}$ alkyl group, preferably each a 2-ethylhexyl group, and x is an integer in the range of from 2 to 5,
  (c3) $(R^5O)_3P$=O, wherein $R^5$, independent of each other, denote a branched $C_6$-$C_{12}$ alkyl group.

Even more preferably, constituent (c) of the compositions according to the present invention comprises or consists of one or more esters selected from the group consisting of (c1) to (c3):
  (c1) $R^1COOR^2$, wherein $R^1$ denotes a branched $C_8$ alkyl group and $R^2$ denotes a branched $C_9$ alkyl group,
  (c3) $R^3OOC$—$(CH_2)x$-$COOR^4$, wherein $R^3$ and $R^4$, independent of each other, denote a branched $C_8$ alkyl group, preferably each a 2-ethylhexyl group, and x is 2, 3 or 4,
  (c3) $(R^5O)_3P$=O, wherein $R^5$, independent of each other, denote a branched $C_8$ alkyl group.

Preferably, from a practical perspective and for reasons of (synthetic and/or commercial) availability, in compositions according to the present invention, in constituent (c2) preferably $R^3$ and $R^4$ both denote the same alkyl group, and in constituent (c3) all three $R^5$ denote the same alkyl group.

In own experiments the following constituents (c) gave particularly improved properties for the compositions according to the present invention. Therefore, preferably, constituent (c) of the compositions according to the present invention comprises or consists of one or more esters selected from the group consisting of (c1) 3,5,5-trimethylhexyl 3,5,5-trimethylhexanoate, 7-methyloctyl 7-methyloctanoate,
(c2) bis(2-ethylhexyl) adipate, bis(2-ethylhexyl) succinate, and
(c3) tris(2-ethylhexyl) phosphate.

It was for example found that in case of glyphosate salts as constituent (a), the improved properties mentioned above of the compositions of the present invention were observed when constituent (c) comprised or consisted of constituent (c2). For example, particularly improved rainfastness was observed when bis(2-ethylhexyl) adipate was used as constituent (c2).

It was for example also found that in case of glufosinate salts as constituent (a), the improved properties mentioned above of the compositions of the present invention were observed when constituent (c) comprised or consisted of constituents (c1) or (c3). For example, particularly improved rainfastness was observed when isononyl isononanoate and/or 3,5,5-trimethylhexyl 3,5,5-trimethylhexanoate was used as constituent (c1) or when tris(2-ethylhexyl) phosphate was used as constituent (c3).

Preferred according to the present invention are compositions, wherein the ratio by weight of the total amount of constituent (a)
to the total amount of constituent (b) is in the range of from 10:1 to 1:6,
and/or
to the total amount of constituent (c) is in the range of from 60:1 to 2:1.

More preferred according to the present invention are compositions, wherein the ratio by weight of the total amount of constituent (a)
to the total amount of constituent (b) is in the range of from 8:1 to 1:3,
and/or
to the total amount of constituent (c) is in the range of from 40:1 to 3:1.

The optimum ratio ranges of constituent (a) to constituents (b) and (c) in a composition according to the present invention depend to some extent on the water-soluble herbicidal active crop protectant ingredient used and on the amount thereof included in the composition.

For example, in a composition according to the present invention wherein glufosinate-ammonium is (part of) constituent (a), the preferred ratio by weight of the total amount of constituent (a)
to the total amount of constituent (b) is in the range of from 3:2 to 1:6,
and/or
to the total amount of constituent (c) is in the range of from 25:1 to 2:1.

More preferably, in a composition according to the present invention wherein glufosinate-ammonium is (part of) constituent (a), the ratio by weight of the total amount of constituent (a)
to the total amount of constituent (b) is in the range of from 1:1 to 1:3,
and/or
to the total amount of constituent (c) is in the range of from 10:1 to 3:1.

For example, in a composition according to the present invention wherein one of the above-mentioned glyphosate-salts is (part of) constituent (a), the preferred ratio by weight of the total amount of constituent (a)

to the total amount of constituent (b) is in the range of from 8:1 to 1:1,
and/or
to the total amount of constituent (c) is in the range of from 25:1 to 4:1.

More preferably, in a composition according to the present invention wherein one of the above-mentioned glyphosate-salts is (part of) constituent (a), the ratio by weight of the total amount of constituent (a)
to the total amount of constituent (b) is in the range of from 7:1 to 2:1,
and/or
to the total amount of constituent (c) is in the range of from 20:1 to 5:1.

Suitable organic solvents of constituent (d) of the compositions according to the present invention are different from constituent (c) and preferably are water-miscible organic solvents, examples being
 aliphatic alcohols, such as lower alkanols, for example, such as methanol and ethanol or polyhydric alcohols such as ethylene glycol and glycerol,
 polar ethers such as alkylene glycol monoalkyl and dialkyl ethers, such as propylene glycol, propylene glycol monomethyl ether, propylene glycol monoethyl ether, dipropylene glycol, dipropylene glycol monomethyl ether, ethylene glycol monomethyl ether or monoethyl ether, diethylene glycol, hexylene glycol, diglyme and tetraglyme;
 amides such as dimethylformamide, dimethylacetamide, dimethylcaprylamide, dimethylcapramide and N-alkylpyrrolidones.

Preference is given here to largely water-miscible organic solvents. Preferably, constituent (d) comprises or consists of propylene glycol monomethyl ether, dipropylene glycol and/or propylene glycol, and preferably comprises or consists of 1-methoxy-2-propanol and/or dipropylene glycol.

Preferably, a composition according to the present invention contains constituent (d) in a total amount 0% to 15% by weight, based on the total weight of the composition. The total amount of constituent (d) in a composition according to the present invention however inter alia depends on the water-soluble herbicidal active crop protectant ingredient(s) present as (part of) constituent (a), i.e. the type (a) active ingredients.

For example, in a composition according to the present invention wherein glufosinate-ammonium is (part of) constituent (a), the preferred total amount by weight of constituent (d) is in the range of 5% to 15% by weight, preferably in the range of 7% to 12% by weight, in each case based on the total weight of the composition. These amounts in particular apply for the case that glufosinate-ammonium is (part of) constituent (a) and constituent (d) comprises or consists of propylene glycol monomethyl ether, dipropylene glycol and/or propylene glycol, and preferably comprises or consists of 1-methoxy-2-propanol and/or dipropylene glycol.

For example, in a composition according to the present invention wherein a glyphosate-salt is (part of) constituent (a), the preferred total amount by weight of constituent (d) is in the range of 0% to 5% by weight, preferably 0% by weight (i.e. free of organic solvents of constituent (d)), in each case based on the total weight of the composition.

The organic solvents of constituent (d) of the compositions according to the present invention should only to be used in amounts such that the aqueous phase is stable, preferably in the form of a thermodynamically stable aqueous solution.

The compositions of the present invention may optionally comprise as constituent (f) other surfactants (anionic, cationic or zwitterionic and/or nonionic surface-active compounds (surfactants)) not belonging the group of constituent (b) of the compositions according to the present invention which are able to further contribute to improved stability, further improved plant availability or further improved activity of the water-soluble herbicidal active crop protectant ingredients (type (a) active ingredients).

As constituent (g), the compositions of the invention can comprise customary formulation adjuvants, examples being inert materials, such as stickers, wetters, dispersants, emulsifiers, penetrants, preservatives, inorganic salts, stabilizers, frost protectants, fillers, carriers and colorants, evaporation inhibitors and pH modifiers (buffers, acids, and bases), viscosity modifiers (e.g., thickeners) or defoamers. The addition of inorganic salts, preferably ammonium salts such as ammonium chloride or ammonium sulfate, may be of advantage, particularly in combination with certain surfactants or with polyvinyl alcohol (see hereinafter).

Due to the presence of constituent (b), it is often advantageous to include a defoamer as (part of) constituent (g) of the present invention. Suitable defoamers include all customary defoamers, preferably silicone-based defoamers, such as silicone oils, for example. The silicone oils can also be used as emulsions.

Defoamers from the group of the linear polydimethylsiloxanes contain as their chemical backbone a compound of the formula HO—[Si(CH$_3$)$_2$—O—]$_n$—H, in which the end groups are modified, by etherification for example, or in general are attached to the groups —Si(CH$_3$)$_3$. Preferred defoamers are those from the group of the linear polydimethylsiloxanes, preferably containing silica, in particular those mentioned in U.S. Pat. No. 8,901,041. Silica embraces forms/modifications such as polysilicic acids, meta-silicic acid, ortho-silicic acid, silica gel, silicic acid gels, kieselguhr, precipitated SiO$_2$, etc.

Preferred according to the present invention are compositions, wherein constituent (d) comprises or consists of propylene glycol monomethyl ether, dipropylene glycol and/or propylene glycol, and preferably comprises 1-methoxy-2-propanol,
and/or
constituent (f) comprises or consists of alkyl sulfosuccinate salts (diesters and monoesters), preferably comprises or consists of $C_6$-$C_{14}$ alkyl sulfosuccinate monoester salts, more preferably comprises or consists of laureth-3 sulfosuccinate salts, in particular disodium laureth-3 sulfosuccinate,
and/or
constituent (g) comprises a defoaming agent, preferably an polydimethylsiloxane oil with silica gel.

Preferred according to the present invention are compositions, wherein constituent (d) comprises 1-methoxy-2-propanol, and wherein the composition preferably comprises polydimethylsiloxane oil with silica gel as defoaming agent (as (part of) constituent (g)),
and
constituent (f) comprises or consists of alkyl sulfosuccinate salts (diesters and monoesters), preferably comprises or consists of $C_6$-$C_{14}$ alkyl sulfosuccinate monoester salts, more preferably comprises or consists of laureth-3 sulfosuccinate salts, in particular disodium laureth-3 sulfosuccinate.

As constituent (h), the compositions of the invention can comprise other herbicidal active crop protectant ingredients (i.e. different from constituent (a)) and/or herbicide safeners.

Preferably, such other herbicidal active crop protectant ingredients are have a low water solubility at 20° C. and 1013 mbar, preferably at pH 7, of 1 g/l or lower, more preferably of 0.5 g/l or lower. Preferred herbicide safeners of constituent (h) are cyprosulfamide, isoxadifen-ethyl, mefenpyr-diethyl, benoxacor, flurazol and cloquintozet-mexyl.

In case the compositions of the present invention comprise other herbicidal active crop protectant ingredients (i.e. different from constituent (a)) having a low water solubility as constituent (h), it is preferred to include one or more stabilizers as part of constituent (f) or (g).

Such a stabilizer can be a dispersant or a suspending agent, e.g. from the group of ionic polymers, like Sodium naphthalene sulphonate formaldehyde condensates or Kraft-lignosulfonate sodium salt, like Morwet D245 (Akzo Nobel) or Kraftsperse 25M (Ingevity), or from the group of non-ionic polymers, like Polyethoxylated polymethacrylates, like Atlox 4913 (Croda).

Such a stabilizer can be a dispersant or suspending agent, e.g, from the group of ionic surfactants, like Dialkyl naphthalene sulfate sodium, like Oparyl MT800 (Bozetto), or non-ionic surfactants, like Tristyryl phenol alkoxylates, like Soprophor 796/P (Solvay) or block-co-polymers of ethylene/propylene oxides, like Pluronic PE 6800 (BASF).

Such a stabilizer can be from the group of the aluminum silicates and can be a mineral fiber, such as a fiberlike magnesium and aluminum silicate attapulgite, preferably ®Attagel 40 (BASF) or ®Clarsol ATC (from CECA, Dusseldorf, Germany). Also suitable are ®Bentone EW (from Elementis), which likewise comprise hectorites as their base material.

The constituents used to prepare and obtain the compositions in the context of the present invention are known and many of these constituents are commercially available.

The compositions of the present invention are prepared by conventional methods, by mixing and homogenizing the active ingredient (a) in solid or already dissolved form, and all other constituents, with stirring where appropriate.

In a further aspect, the present invention relates to a process for preparing a composition according to the present invention as defined herein, which comprises mixing constituents (a) to (c) and optionally further constituents present in said composition.

In case constituents (f), (g) and/or (h) as defined herein are present in a composition according to the present invention, and e.g. are poorly water soluble, it may be beneficial to include a milling step, e.g. using a colloid mill or stirred bead mill.

The compositions of the present invention exhibit good storage properties (i.e. storage stability, including low-temperature stability), high bioavailability and hence activity of the water-soluble active crop protectant ingredients, i.e. of constituent(s) (a).

The compositions of the present invention are especially suitable for use in crop protection for controlling unwanted plant growth both on uncultivated land and in crops tolerant to the herbicide(s) of constituent (a) of the compositions of the present invention.

In a further aspect, the present invention relates to a method of controlling unwanted plant growth, which comprises applying an effective amount of a composition according to the present invention as defined herein to plants, parts of plants or the cultivation area.

In a further aspect, the present invention relates to the use of a composition according to the present invention as defined herein for controlling unwanted plant growth.

In a further aspect, the present invention relates to the use of one or more esters selected from the group consisting of (c1) to (c3) as defined herein for improving the rainfastness of a composition comprising one or more water-soluble herbicidal active crop protectant ingredients (type (a) active ingredients), in particular the water-soluble herbicidal active crop protectant ingredients mentioned as being preferred in the context of the present invention.

It has further been found that the rainfastness and/or herbicidal activity of the compositions according to the present invention can further be improved if a composition according to the present invention is combined with one or more polyvinyl alcohols.

Thus, in a further aspect, the present invention also relates to a combination of (i) a composition according to the present invention as defined herein, and (ii) one or more polyvinyl alcohols.

Such a combination can be in form of a kit-of-parts or a co-pack (suitable or recommended for tank-mixing)) or a tank-mix.

In such a combination, the preferred ratio of the total amount by weight of polyvinyl alcohols to a composition according to the present invention is in the range of from 1:100 to 1:5,
and/or
to the total amount of constituent (c) of a composition according to the present invention is in the range of from 5:1 to 1:5.

In such a combination, the more preferred ratio of the total amount by weight of polyvinyl alcohols to a composition according to the present invention is in the range of from 1:50 to 1:10,
and/or
to the total amount of constituent (c) of a composition according to the present invention is in the range of from 3:1 to 1:3.

In such a combination, the particularly preferred ratio of the total amount by weight of polyvinyl alcohols
to a composition according to the present invention is in the range of from 1:30 to 1:12,
and/or
to the total amount of constituent (c) of a composition according to the present invention is in the range of from 2:1 to 1:2.

In the context of the present invention the polyvinyl alcohols used in combination with a composition according to the present invention preferably are partially hydrolyzed polyvinyl acetates with a degree of hydrolysis in the range of from 75 to 97 mol.-%, more preferably with a degree of hydrolysis in the range of from 80 to 95 mol.-%, and even more preferably with a degree of hydrolysis in the range of from 84 to 92 mol.-%.

The degree of polymerization of the polyvinyl alcohols used preferably is in the range of 150 to 1000, more preferably in the range of 250 to 750, and even more preferably in the range of 250 to 500.

The viscosity of a 4 wt.-% aqueous solution of the polyvinyl alcohols used measured at 20° C. according to DIN 53015:2001-02 (issued 2001-02) (Measurement of viscosity by means of the rolling ball viscometer) preferably is in the range of 3 to 50 mPas, more preferably is in the range of 3.5 to 10 mPas and even more preferably is in the range of 3.5 to 6 mPas.

Such polyvinyl alcohols are commercially available, for example the POVAL® product range from Kuraray.

EXAMPLES

Unless indicated otherwise, all amounts indicated in the following are in percent by weight (wt.-%).

Abbreviations and products used (including trade names):
a.i.=(Amount of) Active ingredient
GFA=Glufosinate-ammonium
GFP=L-Glufosinate-ammonium
GIPA=Glyphosate-isopropylammonium
®Genapol LRO Paste=$C_{12}/C_{14}$ fatty alcohol diethylene glycol ether sulfate sodium, used as a 70% wt.-% solution in water, Clariant)
®Salacos 99=Isononyl isononanoate (Nisshin Oillio)
POVAL™ 4-88=Polyvinyl alcohol (degree of hydrolysis of the polyvinyl acetate about 88%) (Kuraray)
®Disflamoll TOF=Tri-(2-ethylhexyl)-phosphate (Lanxess)
®Empicol SDD/O=Disodium Laureth-3 Sulfosuccinate (used as a 33% strength aqueous solution, Huntsman)
DEHA=Bis(2-ethylhexyl)adipate (e.g. Adimoll® DO, Lanxess)
Dowanol™ PM=Propylene glycol mono methyl ether (Dow)
®Silcolapse 482=Polydimethylsiloxane defoamer with silica gel (Bluestar Silicones)
®Agnique PG 8105=$C_8$-$C_{10}$ Alkyl polyglycosides (used as 62-65 wt.-% strength aqueous solution (BASF)
®Reax 88A=Lignosulfonic acid, sodium salt, sulfomethylated (sodium salt of a chemically modified low molecular weight Kraft lignin polymer solubilized by five sulfonate groups, DKSH)
®Ultrazine NA=Purified sodium lignosulphonate (Borregaard)
Synergen™ GA=$C_8$-$C_{10}$ alkylglucamides (used as a 50% strength aqueous solution, Clariant)
®Sokolan CP5=Copolymer of methacrylic acid and acrylic acid (used as a 40% strength aqueous solution, BASF)
®Ammonyx M=Myristamine Oxide (used as a 25% strength aqueous solution, Stepan)

TABLE R1

Reference formulation GFA SL196

| Constituent | Amount in wt.-% |
|---|---|
| Glufosinate-ammonium (GFA) | 18 |
| Genapol LRO Paste | 22.5 |
| 1-Methoxy-propan-2-ol | 10 |
| Silcolapse 482 | 0.25 |
| Water | ad 100 |

TABLE R2

Reference formulation GIPA51

| Constituent | Amount in wt.-% |
|---|---|
| Glyphosate-isopropylammonium (GIPA) | 51 |
| 3-Isotridecyloxypropanamine, ethoxylated (5 EO) | 7.5 |
| Water | 41.5 |

Biological Examples

The growth stages of the different weed species are indicated according to the BBCH monograph "Growth stages of mono- and dicotyledonous plants", 2nd edition, 2001, ed. Uwe Meier, Federal Biological Research Centre for Agriculture and Forestry (Biologische Bundesanstalt für Land und Forstwirtschaft). The respective BBCH stages are indicated for the different weed species hereinafter.

In the following Tables 01 to 08, for reasons of comparability of the test results, the amounts in percent indicated for the respective test compounds are by weight and refer to the absolute amount of the respective test compound used, i.e. any diluents (like e.g. water) present in the commercial product with the trade names indicated above are not reflected in said amounts. For example, if Empicol SDD/O (a 33% strength aqueous solution of Disodium Laureth-3 Sulfosuccinate) was used, the amount of 5% indicated in a Table is the amount of Disodium Laureth-3 Sulfosuccinate (and corresponds to an amount of 15% of the commercial product Empicol SDD/O).

Greenhouse rainfastness trials: Chenopodium album (CHEAL) and Lolium multiflorum (LOLMU) plants were grown in 7 cm pots in the greenhouse until they reached an adequate developmental stage, provided in the different results tables and applied after selection for uniform plants. 400 g a.i./ha GFA SL196 formulation and mixtures with different test compounds and the GFA SL196 formulation in a rate of 400 g a.i./ha and 10 wt.-% of test compounds were applied in a linear track sprayer outfitted with 002 flat fan nozzles at a water application rate of 300 L/ha. Six sets of plants containing 4 replications of each of the weed species were treated with the different test mixtures and the reference containing the GFA SL196 formulation. The first set did not receive irrigation after treatment, whereas the 5 remaining sets received an irrigation of 5.5 L/m² at 2 h after the initial herbicide treatment. The irrigation was applied on a linear track sprayer outfitted with 8005 flat fan spray nozzles in a row at 1.5 Bar water pressure providing 5.5 mm of rain for each set of plants. Fourteen days after application (14 DAA) the different weed species were visually rated on a percentage scale in relation to the untreated control (100%=all plants dead; 50%=green plant biomass reduced by 50%, and 0%=no discernible difference=like control plot) (see Table 01 and Table 02 for Chenopodium alba).

In the second rainfastness trial the conditions were similar with exception that the application rate of GFA was reduced to 350 g a.i./ha GFA. The amount of selected test compounds was reduced to 3 wt.-% and 5 wt.-%, respectively (Table 03 Chenopodium alba and Table 04 Lolium multiflorum).

In a further rainfastness trial, glyphosate (used as 540 g a.i./ha GIPA) was tested in mixture with selected test compounds in an amount of 3 wt.-% and 5 wt.-%, respectively (Table 05 Chenopodium alba).

TABLE 01

Comparative tests with Glufosinate-ammonium (addition of 10 wt.-% of the respective test compound to 400 g a.i./ha GFA) on Chenopodium alba plants (BBCH18-20) in greenhouse rain assay

| | CHEAL (BBCH 18-20) % control compared to untreated plants | | |
|---|---|---|---|
| Composition Tank mix 400 g a.i./ha GFA (SL196) [+10 wt.-% of test compound] | No simulated rain | Simulated rain of 5.5 L/m² 2 h after application | % reduction of control due to simulated rain |
| GFA SL196 (Reference) | 100 | 29 | −71 |
| GFA SL196 + 10% Reax 88 | 100 | 13 | −87 |

TABLE 01-continued

Comparative tests with Glufosinate-ammonium (addition of 10 wt.-% of the respective test compound to 400 g a.i./ha GFA) on *Chenopodium alba* plants (BBCH18-20) in greenhouse rain assay

| Composition<br>Tank mix 400 g a.i./ha GFA (SL196) [+10 wt.-% of test compound] | No simulated rain | CHEAL (BBCH 18-20) % control compared to untreated plants<br>Simulated rain of 5.5 L/m² 2 h after application | % reduction of control due to simulated rain |
|---|---|---|---|
| GFA SL196 + 10% Ultrazine NA | 100 | 14 | −86 |
| GFA SL196 + 10% Synergen GA | 100 | 14 | −86 |
| GFA SL196 + 10% Sokolan CP5 | 100 | 30 | −70 |
| GFA SL196 + 10% Ammonyx M | 100 | 26 | −74 |

TABLE 02

Test results with compositions according to the invention with Glufosinate-ammonium (addition of 10 wt.-% of the respective test compound to 400 g a.i./ha GFA SL196) on *Chenopodium alba* plants (BBCH 18-20) in greenhouse rain assay

| Composition<br>Tank mix 400 g a.i./ha GFA (SL196) [+10% of test compound] | No simulated rain | CHEAL (BBCH 18-20) % control compared to untreated plants<br>Simulated rain of 5.5 L/m² 2 h after application | % reduction of control due to simulated rain |
|---|---|---|---|
| GFA SL196 (Reference) | 100 | 29 | −71 |
| GFA SL196 + 10% DEHA | 100 | 49 | −51 |
| GFA SL196 + 10% Salacos 99 | 100 | 53 | −47 |
| GFA SL196 + 10% Disflamoll TOF | 100 | 59 | −41 |
| GFA SL196 + 10% POVAL 4-88 | 100 | 66 | −34 |

TABLE 03

Test results with compositions according to the invention with GFA (addition of Salacos 99; Disflamoll TOF; POVAL 4-88 to 350 g a.i./ha GFA SL196) on *Chenopodium alba* plants (BBCH 17-19) in greenhouse rain assay

| Composition<br>Tank mix 350 g a.i./ha GFA (SL196) [+ test compound(s)] | No simulated rain | CHEAL (BBCH 18-20) % control compared to untreated plants<br>Simulated rain of 5.5 L/m² 2 h after application | % reduction of control due to simulated rain |
|---|---|---|---|
| GFA SL196 (Reference) | 90 | 19 | −79 |
| GFA SL196 + 5% POVAL 4-88 + 3% Salacos 99 | 99 | 38 | −62 |
| GFA SL196 + 5% POVAL 4-88 + 3% Disflamoll TOF | 89 | 34 | −62 |

TABLE 04

Test results with compositions according to the invention with GFA - addition of 3% Bis(2-ethylhexyl)adipate (DEHA) to 350 g a.i./ha GFA SL196) on *Lolium multiflorum* plants (BBCH 21-24) in greenhouse rain assay

| Composition<br>Tank mix 350 g a.i./ha GFA (SL196) [+ DEHA] [+ test compound(s)] | No simulated rain | LOLMU (BBCH 21-24) % control compared to untreated plants<br>Simulated rain of 5.5 L/m² 2 h after application | % reduction of control due to simulated rain |
|---|---|---|---|
| GFA SL196 (Reference) | 82 | 18 | −78 |
| GFA SL196 + 3 wt.-% DEHA | 86 | 23 | −73 |

TABLE 05

Test results with compositions according to the invention with Glyphosate (with addition of Bis(2-ethylhexyl)adipate; Salacos 99; POVAL 4-88; Empicol SDD/O) to 540 g a.i./ha GIPA) on *Chenopodium alba* (CHEAL) plants (BBCH 17-19) in greenhouse rain assay

| Composition<br>Tank mix 540 g a.i./ha GIPA (Applied at 300 L/ha) [+ test compound(s)] | No simulated rain | CHEAL (BBCH 17-19) % control compared to untreated plants<br>Simulated rain of 5.5 L/m² 2 h after application | % reduction of control due to simulated rain |
|---|---|---|---|
| GIPA51 (Reference) | 35 | 8 | −77 |
| GIPA51 + 5% POVAL 4-88 | 42 | 29 | −31 |
| GIPA51 + 3% DEHA | 31 | 33 | −0 |
| GIPA51 + 3% Salacos 99 | 56 | 24 | −57 |
| GIPA51 + 3% DEHA + 5% Empicol SDD/O | 50 | 36 | −28 |

Field Trial to Evaluate Weed Control Efficacy:

Compounds that were tested in the greenhouse before, were tested in the field, with 350 g a.i./ha of GFA, alone as well as in various combinations to evaluate efficacy under field conditions. Applications were made to seeded weeds in a replicated randomized complete block design. Test compounds were added to the GFA SL196 formulation at a rate of 3% wt.-% and 5% wt.-%, respectively. The plots were sprayed using a 140 L/ha application volume with a hand held spray boom. Fourteen days after application (14 DAA) the different weed species were visually rated on a percentage scale in relation to the untreated control (100%=all plants dead; 50%=green plant biomass reduced by 50%, and 0%=no discernible difference=like control plot) (see Table 06a, Table 06b, Table 07).

The effects on the following weeds were assessed (depending on presence in the respective field): *Abutilon theophrasti* (ABUTH), *Chenopodium album* (CHEAL), *Avena fatua* (AVEFA), *Bassia scoparia* (KCHSC) and *Triticum aestivum* (TRZAS).

TABLE 06a

Weed control efficacy for dicotyledonous weeds - Field trials for compositions according to the invention with Glufosinate-ammonium improving activity in field trials. Trials performed in tank mix of 350 g a.i. GFA SL196 + Bis(2-ethylhexyl)adipate; Disflamoll TOF; Salacos 99; POVAL 4-88; BBCH code provided at time of application

| Tank mix 350 g a.i. / ha GFA (SL196) [+ test compound(s)] | % Control compared to untreated plants | | | |
|---|---|---|---|---|
| | ABUTH BBCH 14 | CHEAL BBCH 18 | CHEAL BBCH 18 | KCHSC BBCH 20 |
| GFA SL196 (Reference) | 74 | 75 | 39 | 88 |
| GFA SL196 + 3% Salacos 99 | 79 | 82 | 42 | 89 |
| GFA SL196 + 3% DEHA | 79 | 77 | 42 | 91 |
| GFA SL196 + 3% Disflamoll TOF | 80 | 72 | 40 | 92 |
| GFA SL196 + 5% POVAL 4-88 + 3% Salacos 99 | | | 52 | 93 |
| GFA SL196 + 5% POVAL 4-88 + 3% Disflamoll TOF | | | 43 | 94 |

TABLE 06b

Weed control efficacy for monocotyledonous weeds (grasses) - Field trials for compositions according to the invention with Glufosinate-ammonium improving activity in field trials. Trials performed in tank mix of 350 g a.i. GFA + Bis(2-ethylhexyl)adipate; Disflamoll TOF; Salacos 99; POVAL 4-88; BBCH code provided at time of application

| Tank mix 350 g a.i./ha GFA (SL196) [+ test compound(s)] | % Control compared to untreated plants | |
|---|---|---|
| | AVEFA BBCH 23 | AVEFA BBCH 22 |
| GFA SL196 (Reference) | 32 | 75 |
| GFA SL196 + 3% Salacos 99 | 40 | 79 |
| GFA SL196 + 3% DEHA | 33 | 80 |
| GFA SL196 + 3% Disflamoll TOF | 37 | 82 |
| GFA SL196 + 5% POVAL 4-88 + 3% Salacos 99 | 40 | 85 |
| GFA SL196 + 5% POVAL 4-88 + 3% Disflamoll TOF | 40 | 83 |

TABLE 07

Weed control efficacy - Comparative field trial results for formulations with Glufosinate-ammonium. Trials performed in tank mix of 350 g a.i. GFA + 3% test compound, respectively; BBCH code provided at time of application

| Tank mix 350 g a.i./ha GFA (SL196) [+ 3 wt.-% test compound] | % Control compared to untreated plants | | |
|---|---|---|---|
| | AVEFA BBCH 23 | KCHSC BBCH 20 | CHEAL BBCH 18 |
| GFA SL196 (Reference) | 44 | 60 | 66 |
| GFA SL196 + 3% Reax 88A | 20 | 33 | 30 |
| GFA SL196 + 3% Synergen GA | 25 | 53 | 47 |
| GFA SL196 + 3% Ammonyx M | 22 | 20 | 28 |
| GFA SL196 + 3% Sokolan CP5 | 30 | | 50 |

Field Trial to Determine Rainfastness:

350 g a.i./ha GFA as GFA 196SL formulation alone and in combination with selected test compounds at a rate of 3 wt.-% or 5 wt.-% were applied to wheat (TRZAS) plants at growth stage BBCH 23. The plots were sprayed with an application volume of 140 L/ha with a hand held spray boom. Approximately 20 L/m$^2$ of water was irrigated 1 h after application on half the treatments. Fourteen days after application (14 DAA) the different weed species were visually rated on a percentage scale in relation to the untreated control (100%=all plants dead; 50%=green plant biomass reduced by 50%, and 0%=no discernible difference=like control plot) (see Table 8).

TABLE 8

Field trials to determine rainfastness of compositions according to the invention in wheat (TRZAS). Trials were performed with tank mixes of 350 g a.i. GFA + Bis(2-ethylhexyl)adipate (DEHA); Salacos 99; POVAL 4-88; Empicol SDD/O; BBCH code provided at time of application

| Tank mix field trial (Applied at 187 L/ha) 350 g a.i. [+ test compound(s)] | TRZAS (BBCH 23) % control compared to untreated plants | | |
|---|---|---|---|
| | No simulated rain | Simulated rain of 20 L/m$^2$ 2 h after application | % reduction of control due to simulated rain |
| GFA SL196 (Reference) | 28 | 0 | -100 |
| GFA SL196 + 5% POVAL 4-88 | 48 | 29 | -40 |
| GFA SL196 + 3% Salacos 99 + 5% Empicol SDD/O | 40 | 25 | -37 |
| GFA SL196 + 3% DEHA | 48 | 10 | -79 |

Composition stability and appearance tests: In view of the biological test results above, in a next step it was assessed whether the test compounds that gave good biological results and other compounds belonging to the same compound classes would be promising to be incorporated into a suitable formulation.

The compositions according to Table FL.1 were tested for their respective physical appearance and formulation stability.

TABLE F1.1

Formulations used for assessing physical appearance and formulation stability

| Constituent | Amount in wt.-% |
|---|---|
| Glufosinate-ammonium (GFA) | 18 |
| Alkyl ether sulfate C12-14 with 2EO, sodium salt [Sodium lauryl ether sulfate (SLES)] | 21 |
| Constituents #1.1 to #1.11 listed in Table F1.2 below | 5 |
| 1-Methoxy-propan-2-ol | 10 |
| Water | ad 100 |

TABLE F1.2

Constituents used in formulations according to Table F1.1

| # | Constituent | Product name | Appearance of formulation (see Table F1.1) |
|---|---|---|---|
| 1.1 | Dimethyl succinate/glutarate/adipate (mixture) | Rhodiasolv® RPDE, Solvay | Phase separation |
| 1.2 | Diisopropyl adipate | Crodamol® DA, Croda | Phase separation |
| 1.3 | Di-2-ethylhexyl succinate | Crodamol® OSU, Croda | Clear |
| 1.4 | Di-2-ethylhexyl adipate | Adimoll® DO, Lanxess | Clear |
| 1.5 | 2-Ethylhexyl caprate/caprylate (mixture) | Radia® 7126, Oleon | Clear |
| 1.6 | Isononyl isononanoate | Salacos® 99, Nisshin Oillio | Clear |
| 1.7 | Alkylnaphthalene (mixture) | Solvesso® 200 ND, ExxonMobil | Gel formation |

TABLE F1.2-continued

Constituents used in formulations according to Table F1.1

| # | Constituent | Product name | Appearance of formulation (see Table F1.1) |
|---|---|---|---|
| 1.8 | Myristyl lactate | Crodamol® ML, Croda | Gel formation |
| 1.9 | N-Butylpyrrolidone | Genagen® NBP, Clariant | Phase separation |
| 1.10 | Tributoxyethyl phosphate | Amgard® TBEP, Solvay | Phase separation |
| 1.11 | Tri-2-Ethylhexyl phosphate | Disflamoll® TOF, Lanxess | Phase separation |

In the following Tables F2.1 to F2.5 the appearance of different compositions according to the present invention was assessed 24 hours after storage at room temperature (approx. 20° C.) (Appearance RT 24 h), and optionally 14 days after storage at 0° C. (Appearance 0° C. 14 d) and 14 days after storage at −10° C. (Appearance−10° C. 14 d).

TABLE F2.1

Variation of the amounts of Agnique PG 8105 and Salacos 99

| Constituent | F2.1a | F2.1b | F2.1c | F2.1d |
|---|---|---|---|---|
| GFA | 24.5 | 24.5 | 24.5 | 24.5 |
| Genapol LRO Paste | 26 | 26 | 26 | 26 |
| Agnique PG 8105 | 9.4 | 8.4 | 7.4 | 5.9 |
| Salacos 99 | 3 | 5 | 7 | 10 |
| 1-Methoxy-propan-2-ol | 4 | 4 | 4 | 4 |
| Dipropylene glycol | 8.6 | 7.6 | 6.6 | 5.1 |
| Water | ad 100 | ad 100 | ad 100 | ad 100 |
| Appearance RT 24 h | Clear | Clear | Clear | Gel |
| Appearance 0° C. 14 d | Clear | Clear | Clear | — |
| Appearance -10° C. 14 d | Clear | Turbid* | Turbid* | — |

*: with 2-3% flocs

TABLE F2.2

Variation of the amount of isononyl isononanoate (Salacos 99)

| Constituent | F2.2a | F2.2b | F2.2c | F2.2d | F2.2e |
|---|---|---|---|---|---|
| GFA | 18 | 18 | 18 | 18 | 18 |
| Genapol LRO Paste | 22.5 | 22.5 | 22.5 | 22.5 | 22.5 |
| Salacos 99 | 1 | 2 | 3 | 4 | 5 |
| 1-Methoxy-propan-2-ol | 10 | 10 | 10 | 10 | 10 |
| Water | ad 100 | ad 100 | ad 100 | ad 100 | ad 100 |
| Appearance RT 24 h | Clear | Clear | Clear | Clear | Clear |

TABLE F2.3

Variation of the amount of di-2-ethylhexyl adipate (Adimoll DO)

| Constituent | F2.3a | F2.3b | F2.3c | F2.3d | F2.3e |
|---|---|---|---|---|---|
| GFA | 18 | 18 | 18 | 18 | 18 |
| Genapol LRO Paste | 22.5 | 22.5 | 22.5 | 22.5 | 22.5 |
| Adimoll DO | 1 | 2 | 3 | 4 | 5 |
| 1-Methoxy-propan-2-ol | 10 | 10 | 10 | 10 | 10 |
| Water | ad 100 | ad 100 | ad 100 | ad 100 | ad 100 |
| Appearance RT 24 h | Clear | Clear | Clear | Clear | Clear |

TABLE F2.4

Variation of the amount of tri-2-ethylhexyl phosphate (Disflamoll TOF)

| Constituent | F2.4a | F2.4b | F2.4c | F2.4d | F2.4e |
|---|---|---|---|---|---|
| GFA | 18 | 18 | 18 | 18 | 18 |
| Genapol LRO Paste | 22.5 | 22.5 | 22.5 | 22.5 | 22.5 |
| Disflamoll TOF | 1 | 2 | 3 | 4 | 5 |
| 1-Methoxy-propan-2-ol | 10 | 10 | 10 | 10 | 10 |
| Water | ad 100 | ad 100 | ad 100 | ad 100 | ad 100 |
| Appearance RT 24 h | Clear | Clear | Clear | Phase separation | Phase separation |

TABLE F2.5

Formulation of GFP and isononyl isononanoate (Salacos 99

| Constituent | F2.5a |
|---|---|
| GFP | 18 |
| Genapol LRO Paste | 30 |
| Salacos 99 | 4 |
| 1-Methoxy-propan-2-ol | 10 |
| Water | ad 100 |
| Appearance RT 24 h | Clear |

The assessment whether a formulation and a particular constituent was considered suitable was not made on a single result or test system but on a sum of results by choosing the most robust combination across test conditions and replicates.

The compositions according to Tables F2.1 to F2.5 of the present invention were stable on storage at 40° C. for more than 2 months, including in particular stability of flow behavior.

What is claimed is:

1. A composition comprising constituents (a) to (c):
   (a) one or more water-soluble herbicidal active crop protectant ingredients;
   (b) one or more $C_{10}$-$C_{16}$ fatty alcohol diethylene glycol ether sulfate salts and/or $C_8$-$C_{12}$ alkylpolyglucosides with a degree of polymerization of less than 5, and/or $C_{12}$-$C_{16}$ alkyl amine ethoxylates with 2 to 10 ethylene oxide (EO) units;
   (c) one or more esters selected from the group consisting of (c1) to (c3):
      (c1) $R^1COOR^2$, wherein $R^1$ denotes a $C_5$-$C_{13}$ alkyl group and $R^2$ denotes a $C_6$-$C_{14}$ alkyl group, wherein a total number of carbon atoms in $R^1$ and $R^2$ taken together is an integer in a range of from 14 to 22;
      (c2) $R^3OOC$—$(CH_2)x$-$COOR^4$, wherein $R^3$ and $R^4$, independent of each other, denote a $C_4$-$C_{12}$ alkyl group, and x is an integer in a range of from 1 to 6; and
      (c3) $(R^5O)_3P$=O, wherein $R^5$, independent of each other, denote a $C_4$-$C_{16}$ alkyl group, wherein a total number of carbon atoms in the three $R^5$ taken together is an integer in a range of from 18 to 42;
   and optionally one or more further constituents selected from the group consisting of constituents (d) to (h):
   (d) organic solvents;
   (e) water;
   (f) one or more alkyl sulfosuccinate salt surfactants;
   (g) one or more formulation adjuvants selected from a defoaming agent, a polydimethylsiloxane oil with silica gel, and a combination thereof, and (h) one or more other herbicidal active crop protectant ingredients and/or herbicide safeners, wherein the one or more other herbicidal active crop protectant ingredients are different than the one or more water-soluble herbicidal active crop protectant ingredients;

wherein a total amount of the constituent (a) to a total amount of the constituent (c) is in a range of from 60:1 to 2:1, and a total amount of constituent (a) to the total amount of constituent (b) is in a range of from 10:1 to 1:6, and wherein the composition exhibits improved rainfastness as compared to a composition including components (a) and (b), and optionally one or more further constituents selected from the group consisting of constituents (d) to (h), but not containing one or more esters selected from the group consisting of (c1) to (c3).

2. The composition as claimed in claim 1, wherein:

the constituent (a) is present in a total amount 5% to 70% by weight;

the constituent (b) is present in a total amount 5% to 60% by weight;

the constituent (c) is present in a total amount 0.5% to 12% by weight;

and optionally:

the constituent (d) is present in a total amount 0% to 15% by weight;

the constituent (e) is present in a total amount 0.1% to 60% by weight;

the constituent (f) is present in a total amount 0.1% to 30% by weight;

the constituent (g) is present in a total amount 0.1% to 20% by weight; and the constituent (h) is present in a total amount 0.1% to 20% by weight;

in each case based on the total weight of the composition.

3. The composition as claimed in claim 1, wherein:

the constituent (a) is present in a total amount 10% to 60% by weight;

the constituent (b) is present in a total amount 5% to 50% by weight;

the constituent (c) is present in a total amount 1% to 10% by weight;

the constituent (e) is present in a total amount 20% to 60% by weight;

and optionally:

the constituent (d) is present in a total amount 0% to 15% by weight;

the constituent (f) is present in a total amount 0.1% to 20% by weight;

the constituent (g) is present in a total amount 0.1% to 12% by weight;

the constituent (h) is present in a total amount 0.1% to 12% by weight; and in each case based on the total weight of the composition.

4. The composition as claimed in claim 1, wherein the constituent (a) one or more water-soluble herbicidal active crop protectant ingredients is selected from the group consisting of glufosinate and salts thereof, glyphosate and salts thereof, MCPA and salts thereof, dicamba and salts thereof, 2,4-D and salts thereof, and dichlorprop and the salts thereof.

5. The composition as claimed in claim 1, wherein the constituent (a) one or more water-soluble herbicidal active crop protectant ingredients is selected from the group consisting of glufosinate-ammonium, glufosinate-sodium, L-glufosinate-ammonium, L-glufosinate-sodium glyphosate-potassium, glyphosate-ammonium, glyphosate-dimethylammonium, glyphosate-isopropylammonium, glyphosate-trimesium (sulfosate), dicamba-diglycolamine, dicamba-BAPMA, and 2,4-D-choline.

6. The composition as claimed in claim 1, wherein the constituent (b) comprises one or more $C_{10}$-$C_{16}$ fatty alcohol diethylene glycol ether sulfate salts and/or $C_8$-$C_{12}$ alkylpolyglucosides with a degree of polymerization of less than 5.

7. The composition as claimed in claim 1, wherein the constituent (b) comprises one or more $C_{12}$-$C_{14}$ fatty alcohol diethylene glycol ether sulfate sodium-, potassium-, ammonium-salts and/or $C_8$-$C_{10}$ alkylpolyglucosides with a degree of polymerization of less than 2, and/or $C_{12}$-$C_{14}$ alkyl amine ethoxylates with 4 to 8 ethylene oxide (EO) units.

8. The composition as claimed in claim 1, wherein:

(c1) $R^1$ denotes a $C_7$-$C_9$ alkyl group and $R^2$ denotes a $C_8$-$C_{10}$ alkyl group, wherein the total number of carbon atoms in $R^1$ and $R^2$ taken together is an integer in the range of from 16 to 20;

(c2) $R^3$ and $R^4$, independent of each other, denote a $C_6$-$C_{10}$ alkyl group, and x is an integer in the range of from 2 to 5; and (c3) $R^5$, independent of each other, denote a $C_6$-$C_{12}$ alkyl group.

9. The composition as claimed in claim 1, wherein:

a ratio by weight of a total amount of the constituent (a) to a total amount of the constituent (b) is in a range of from 3:2 to 1:6; and/or a ratio by weight of a total amount of the constituent (a) to a total amount of the constituent (c) is in a range of from 25:1 to 2:1.

10. The composition as claimed in claim 1, wherein:

a ratio by weight of a total amount of the constituent (a) to a total amount of the constituent (b) is in a range of from 8:1 to 1:3; and/or a ratio by weight of a total amount of the constituent (a) to a total amount of the constituent (c) is in a range of from 40:1 to 3:1.

11. The composition as claimed in claim 1, wherein:

the constituent (d) comprises propylene glycol monomethyl ether, dipropylene glycol and/or propylene glycol; and/or the constituent (g) comprises a defoaming agent.

12. A process for preparing the composition as defined in claim 1, which comprises mixing the constituents (a) to (c) and optionally one or more of the further constituents (d) to (h).

13. A method of controlling unwanted plant growth, which comprises applying an effective amount of the composition as defined in claim 1 to a plant, a part of a plant, or a cultivation area.

14. A method for improving rainfastness of a composition comprising one or more water-soluble herbicidal active crop protectant ingredients, the method comprising:

adding to the composition one or more esters selected from the group consisting of (c1) to (c3):

(c1) $R^1COOR^2$, wherein $R^1$ denotes a $C_5$-$C_{13}$ alkyl group and $R^2$ denotes a $C_6$-$C_{14}$ alkyl group, wherein a total number of carbon atoms in $R^1$ and $R^2$ taken together is an integer in a range of from 14 to 22;

(c2) $R^3OOC$—$(CH_2)x$-$COOR^4$, wherein $R^3$ and $R^4$, independent of each other, denote a $C_4$-$C_{12}$ alkyl group, and x is an integer in a range of from 1 to 6; and (c3) $(R^5O)_3P=O$, wherein $R^5$, independent of each other, denote a $C_4$-$C_{16}$ alkyl group, wherein a total number of carbon atoms in the three $R^5$ taken together is an integer in a range of from 18 to 42; and adding to the composition one or more $C_{10}$-$C_{16}$ fatty alcohol diethylene glycol ether sulfate salts and/or $C_8$-$C_{12}$ alkylpolyglucosides with a degree of polymerization of less than 5, and/or $C_{12}$-$C_{16}$ alkyl amine ethoxylates with 2 to 10 ethylene oxide (EO) units.

15. The composition as claimed in claim 1, wherein:
the constituent (d) comprises 1-methoxy-2-propanol; and/or
the constituent (f) comprises one or more alkyl sulfosuccinate surfactants selected from $C_6$-$C_{14}$ alkyl sulfosuccinate monoester salts; and/or
the constituent (g) comprises a polydimethylsiloxane oil with silica gel.

16. The composition as claimed in claim 1, wherein the constituent (f) comprises one or more laureth-3 sulfosuccinate salts.

17. The composition as claimed in claim 16, wherein the constituent (f) comprises disodium laureth-3 sulfosuccinate.

18. The composition as claimed in claim 1, wherein:
a ratio by weight of a total amount of the constituent (a) to a total amount of the constituent (b) is in a range of from 1:1 to 1:3; and/or
a ratio by weight of a total amount of the constituent (a) to a total amount of the constituent (c) is in a range of from 10:1 to 3:1.

19. The composition as claimed in claim 1, wherein:
a ratio by weight of a total amount of the constituent (a) to a total amount of the constituent (b) is in a range of from 8:1 to 1:1; and/or
a ratio by weight of a total amount of the constituent (a) to a total amount of the constituent (c) is in a range of from 25:1 to 4:1.

20. The composition as claimed in claim 1, wherein:
a ratio by weight of a total amount of the constituent (a) to a total amount of the constituent (b) is in a range of from 7:1 to 2:1; and/or
a ratio by weight of a total amount of the constituent (a) to a total amount of the constituent (c) is in a range of from 20:1 to 5:1.

* * * * *